Jan. 8, 1935.  G. H. ARMACOST  1,986,994
FODDER TIE
Filed Nov. 1, 1933
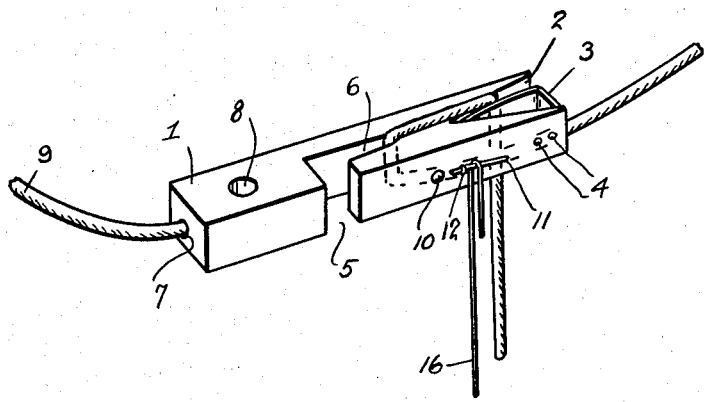
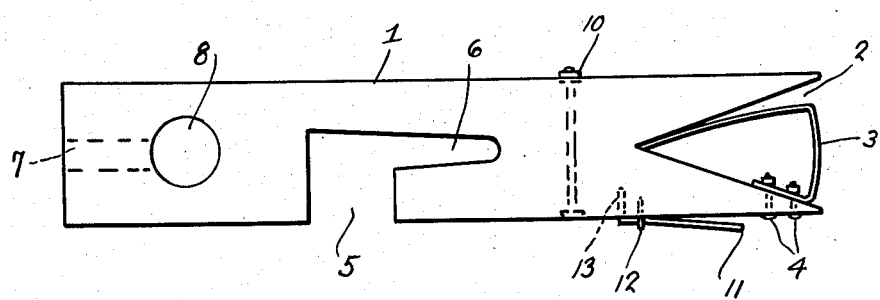
Inventor
G. H. Armacost Patented Jan. 8, 1935

1,986,994

UNITED STATES PATENT OFFICE 1,986,994

FODDER TIE

George H. Armacost, Richmond, Ind.

Application November 1, 1933, Serial No. 696,267

1 Claim. (Cl. 100—31)

This invention relates to a device for facilitating the tying of the shocks of fodder and bundles of hay and the like, the general object of the invention being to provide a block having one end attached to a rope, with means for holding the other end of the rope in the block after the rope has been passed around a shock or bundle.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a perspective view of the device.

Figure 2 is a top plan view of the block.

In this drawing, the numeral 1 indicates the block which is of elongated shape and which has a V-shaped notch 2 in one end thereof in which is placed a substantially triangular shaped spring 3 having one limb shorter than the other, with the short limb fastened to one wall of the notch, as shown at 4, with the long limb located adjacent the other wall of the notch. An opening 5 is formed in an intermediate part of the block and extends transversely thereinto from one side edge of the block, and this opening is formed with a longitudinally extending inner part 6 which is of substantially V-shape and extends toward the notch 2. A hole 7 extends from the other end of the block and communicates with the hole 8 so that one end of a rope 9 can be passed into the hole 7 and drawn through the hole 8, after which the end is knotted so as to attach this end of the rope to the block.

A bolt 10 passes through the block from one side edge to the other and is located between the notch 2 and opening 6 so as to prevent the block from splitting and a spring leaf or clip 11 is attached to one side edge of the block by a staple 12, and by having one end bent and forced into the block, as shown at 13.

In using this device to tie a shock, a piece of binder twine 16 is placed in the clip 11 and one end of the rope 9 is held in the left hand and then the rope and the block are thrown or swung around the shock. The rope is then placed in the opening 6 and the block seized in the left hand and a part of the rope in the right hand and then the two ends of the rope are pulled upon to tighten the rope around the shock. The rope is then pulled into the part 6 of the opening which tends to wedge it and then a part of the rope is passed into the notch 2 so that it will be gripped by the spring 3 which holds the rope between itself and a wall of the notch 2. This action places the twine 16 about the shock and this twine is then tied about the shock. Then the end of the rope is pulled from the notch 2 and out of the part 6 of the opening 5 to release the rope and then the operator can pass to the next shock to tie this shock.

Thus shocks can be easily and quickly tied.

In tying bundles of hay and the like, the rope is placed on the ground and the material to be tied is placed thereon and the above operation carried out.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

A tying device of the class described comprising a block, a rope connected to one end thereof, the other end of the block having a V-shaped notch therein, and a spring in the notch for holding a part of the rope between itself and one wall of the notch, said spring having a short limb fastened to the outer part of one wall of the notch and a part extended substantially at right angles to said short limb and across the mouth of the notch, and a long limb extending inwardly from the last mentioned part with its free end terminating in the apex of the notch, the outer portion of said long limb being slightly spaced from the other wall of the V-shaped notch, said block having a substantially L-shaped opening in an intermediate part of the block having one portion passing through a side edge of the block and the other portion extending toward the notch, the latter portion of the opening being of substantially wedge shape.

GEORGE H. ARMACOST.